UNITED STATES PATENT OFFICE.

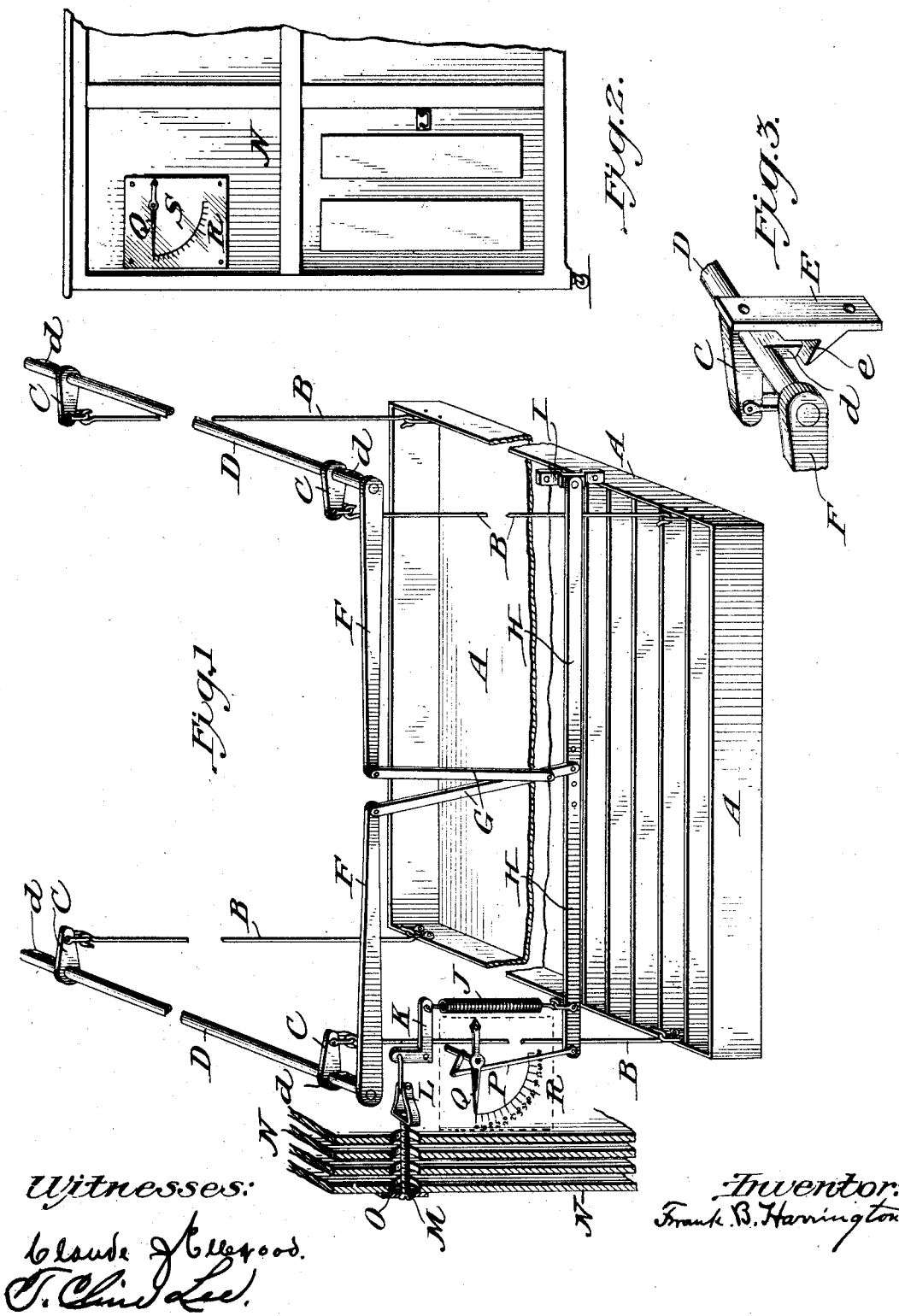

FRANK B. HARRINGTON, OF ELK CITY, OKLAHOMA.

WEIGHING APPARATUS FOR REFRIGERATORS.

1,024,335. Specification of Letters Patent. Patented Apr. 23, 1912.

Application filed October 23, 1911. Serial No. 656,344.

*To all whom it may concern:*

Be it known that I, FRANK B. HARRINGTON, a citizen of the United States, and a resident of Elk City, in the county of Beckham and State of Oklahoma, have invented a Weighing Apparatus for Refrigerators, of which the following is a specification.

My invention is embodied in a weighing apparatus adapted for convenient use within an inclosure such as a refrigerator or icebox, the same being provided with means for attaching it to, and supporting it upon, the inner walls of the receptacle.

The details of construction, arrangement, and operation are as hereinafter described, and illustrated in the accompanying drawing, in which—

Figure 1 is a perspective view of the apparatus, together with a vertical section of a portion of a refrigerator wall. Fig. 2 is a front view of a portion of the refrigerator. Fig. 3 is a perspective view illustrating one of the fulcrums of the rock shafts forming part of the apparatus.

In Fig. 1, A indicates a horizontal ice-rack or pan supported by four vertical rods B from the lugs or short arms C of parallel rock-shafts D, which are arranged over the pan and fulcrumed on brackets E that are fixed to the wall of the refrigerator. The fulcrums proper are lugs $d$ formed on the rock-shafts and resting and adapted to oscillate on the bracket shoulders $e$—see especially Fig. 3. Practically these lugs serve the purpose of the ordinary or well known "knife-edges" with which scale levers are commonly provided. The rock-shafts D are further provided with long radial lever arms F whose inner adjacent ends are connected, by push-rods G, with an indicator beam H which is arranged below the shafts, but near and over one side of the pan A, and is fulcrumed at I on a bracket which is, in practice, screwed to the refrigerator wall. The other or free end of the lever H is suspended by a spiral spring J from one arm of a pivoted elbow lever K, whose other arm is connected by a swiveled stirrup with an adjusting screw M that passes through the refrigerator wall N and also through a metal plate O affixed to the outer side of the wall, as shown. By rotating the screw M, it is apparent that the elbow lever and spring may be adjusted if required to raise the free end of the indicating lever H in order to cause the index to point exactly to zero on the graduated scale. The free end of the beam H is further connected by a rod P with a small rock-shaft to which an index or finger Q is rotatably applied and adapted to sweep over a graduated arc R. In practice, the latter is arranged on the outer side of a refrigerator, as shown in Fig. 2, and is covered and protected by a glass plate S.

From the foregoing description, it will be apparent that ice or other articles to be weighed, upon being placed upon the rack or pan A, will depress the latter corresponding to their weight, and thus, through the medium of the rock-shafts, their lever arms, and push-rods G, the indicating lever H will be depressed correspondingly against the resistance of the spring J, and the index or movable pointer will move over the arc R to a point indicating thereon the weight in pounds and ounces of the article in the pan.

Thus constructed and applied, the apparatus occupies comparatively small space in the refrigerator or other receptacle in which it may be employed, and furnishes a most convenient and speedy means for ascertaining the weight of any article that is to be deposited in the receptacle. The apparatus may be applied in refrigerators and iceboxes already constructed, as well as in receptacles specially constructed to accommodate it.

I do not desire to be understood as confining myself to the details or specific features of construction and arrangement of parts, since such changes and modifications may be made in practice as fairly fall within the scope of my invention.

What I claim is:—

1. The apparatus adapted for the use specified, comprising a pan, parallel rock-shafts arranged over the pan, and means for suspending the latter therefrom, an indicating lever arranged between the pan and the rock-shafts and having a fixed fulcrum, a supporting spring, and a movable index connected with the free end of the indicator, the said rock-shafts having long lever arms, and push-rods connected at their free ends with the indicator lever, whereby a weight imposed on the pan depresses the indicating lever correspondingly, substantially as described.

2. The combination of parallel horizontal rock-shafts, brackets attached to a fixed support and on which the rock-shafts are supported rotatably, lever arms projecting inward from the rock-shafts, an indicating lever pivoted on a fixed fulcrum below the
5 rock-shafts, and push-rods connecting the same with the lever arms, a spring support for the free end of the lever, and means for supporting and adjusting the spring vertically, as shown and described.

FRANK B. HARRINGTON.

Witnesses:
 BENJAMIN R. LEWIS,
 LEWIS F. SIGLIN.